Oct. 19, 1965
H. KROGSRUD
3,213,176
ELECTRODE SUSPENSION MECHANISM AND
METHOD OF OPERATING SAME
Filed March 5, 1963
2 Sheets-Sheet 1
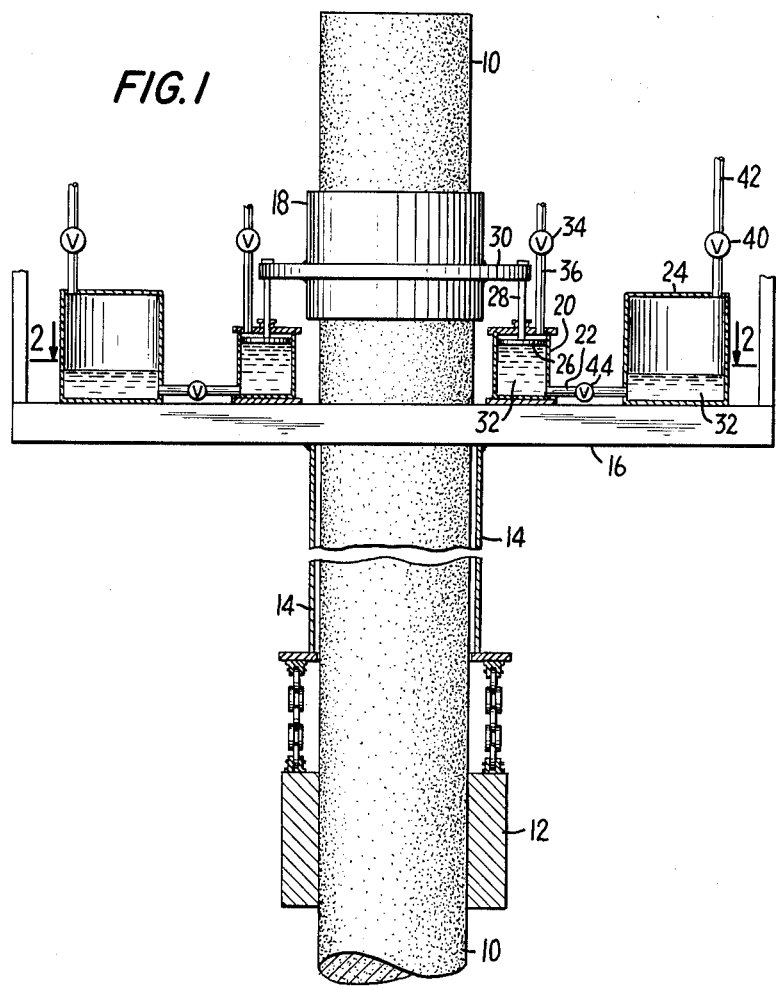
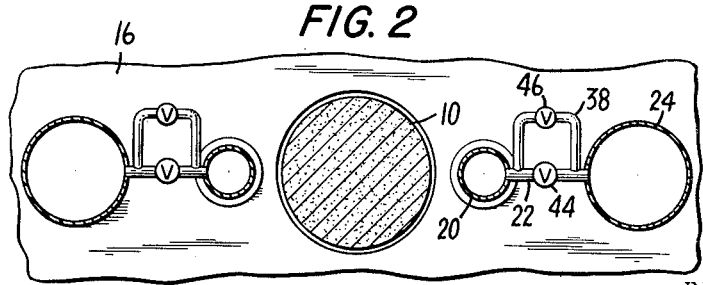
INVENTOR.
HARALD KROGSRUD
BY
*Eyre, Mann & Lucas*
ATTORNEYS

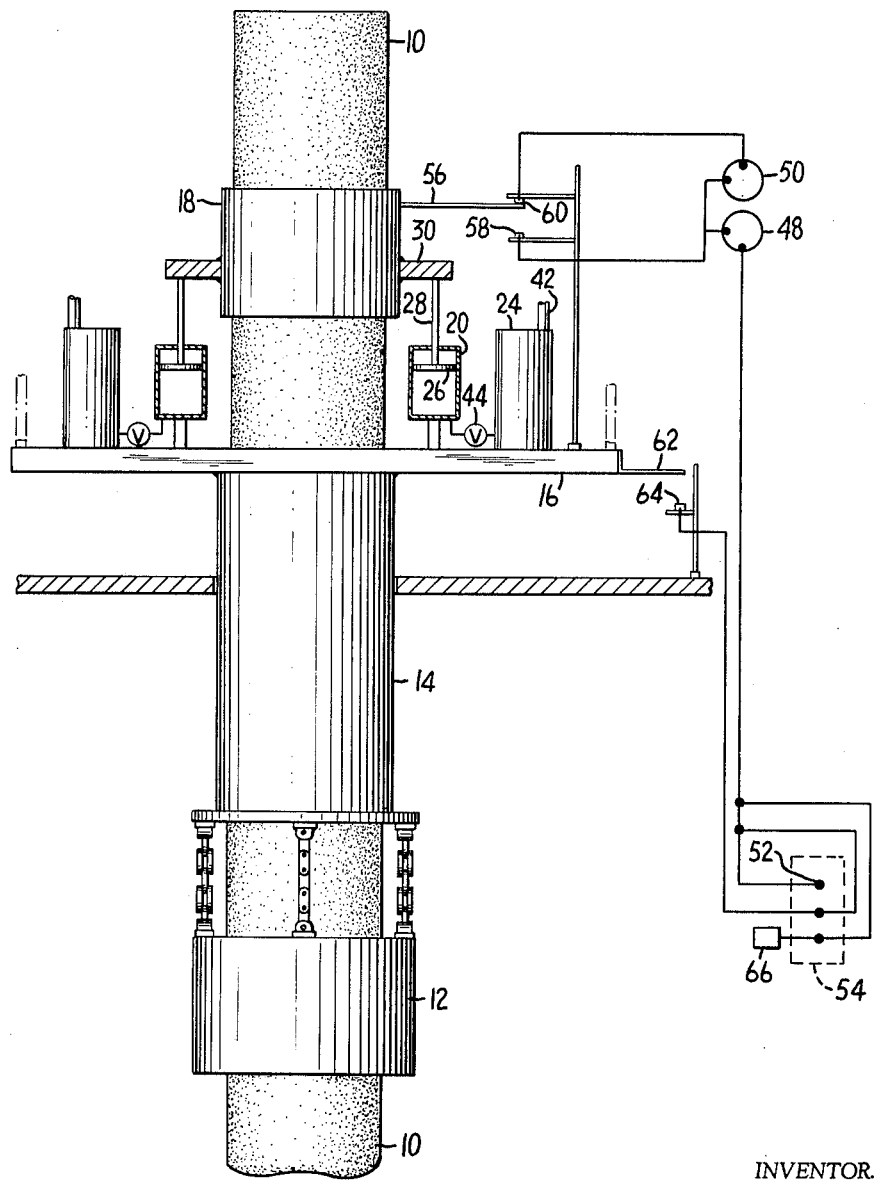

United States Patent Office 3,213,176
Patented Oct. 19, 1965

3,213,176
ELECTRODE SUSPENSION MECHANISM AND
METHOD OF OPERATING SAME
Harald Krogsrud, Gjettum, Oslo, Norway, assignor to
Elektrokemisk A/S, Oslo, Norway, a corporation of
Norway
Filed Mar. 5, 1963, Ser. No. 263,048
Claims priority, application Norway, Mar. 8, 1962,
143,560
11 Claims. (Cl. 13—16)

This invention relates to a method and apparatus for moving an electrode through the holder in an electric furnace whereby a smooth even movement is achieved without shock to the electrode and its suspension mechanism. The invention has particular utility in connection with the self-baking or Soderberg type of electrode but it is also useful with other types of electrodes such as the prebaked type.

As is known, the electrode in an electric smelting furnace is supported and held in the desired position by means of a main clamp or holder which supplies electricity to the electrode. The holder frictionally grips the electrode and as the electrode is consumed during furnace operation it is periodically moved down through the holder. This is done by means of a pressure ring or auxiliary clamp which is adapted to grip the electrode and force it to move down through the holder. Movement of the auxiliary clamp is controlled by a member such as a hydraulic or pneumatic piston which is connected to the auxiliary clamp so that as the member moves it exerts the required force on the clamp to slide the electrode through the holder. After the electrode is moved through the holder, the grip of the auxiliary clamp is relaxed and the member is moved in the opposite direction to slide the clamp along a length of the electrode into the desired starting position where the clamp is again actuated to grip the electrode.

In practical operation an extra pressure ring is provided for safety. The extra ring grips the electrode during those periods when the grip of the holder or auxiliary clamp is relaxed in order to maintain control of the electrode and prevent it from sliding down into the furnace. All of the clamps usually grip the electrode whenever possible but the grip of the holder may be relaxed when the electrode is caused to slide through the holder.

An example of the above described system for controlling the slippage of the electrode through the holder is illustrated in U.S. Patent No. 2,778,865 and while the system is extensively used in commercial operations it frequently happens that the clamps of the holder become welded to the electrode casing because of overheating and local arc formations. When this occurs an extremely powerful force must be exerted on the auxiliary clamp to break the welds and when the welds break the electrode and its suspension mechanism are ordinarily subjected to a sudden shock as the electrode starts to move abruptly and slide down through the holder. This sudden shock may damage the suspension mechanism or break the electrode or it may so disturb the frictional grip of the clamps that the electrode will continue to slide down through the holder of its own weight after controlled slippage is terminated.

In accordance with the present invention a pneumatic-hydraulic system has been devised in which the force required for moving the electrode through the holder is generated under such controlled conditions that the electrode moves through the holder in a smooth, uniform manner without any appreciable shock to the electrode or its suspension mechanism.

To this end, the member which generates the force for moving the electrode through its holder is slidably mounted in a closed system wherein fluid is supplied under pressure to one side of the member to generate the force required to move the member and slide the electrode through its holder. A liquid supplied to the second side of the member is displaced as the member moves and the displaced liquid under controlled conditions of flow is conducted into a space where it compresses air or some other gas. The liquid within the closed system exerts a yielding back pressure against the member to provide a cushion which prevents abrupt movement and sudden shock to the electrode and its suspension mechanism such as would otherwise occur when it is necessary to break the weld between the clamps of the holder and the electrode casing.

After movement of the electrode through the holder is terminated, the grip of the auxiliary clamp is relaxed and the auxiliary clamp is caused to slide along the electrode into the desired position by gradually releasing the fluid pressure from the one side of the member. As the fluid pressure is released the compressed air or other gas in the closed system expands to move the member and cause the auxiliary clamp to slide along the electrode into the desired starting position whereupon the grip of the auxiliary clamp is tightened on the electrode. If desired automatic controls may be employed for operating the system of the present invention.

These and other advantages and the details of a preferred embodiment of the present invention may be readily understood by reference to the accompanying drawings in which:

FIG. 1 is a schematic front elevational view of a mechanism made in accordance with the present invention.

FIG. 2 is taken on line 2—2 of FIG. 1.

FIG. 3 illustrates automatic controls for the device of FIG. 1.

In the drawings 10 indicates the electrode and 12 is the holder which is suspended by means of a suspension casing 14 which in turn is supported by the suspension frame 16. The suspension frame is suspended by an electrode hoist (not shown) which periodically moves the electrode up and down as required for furnace operation.

All of these parts are conventional and well known in the art. As in conventional structures, the frictional grip of the clamps (not shown) of the holder on the electrode is tight enough to support the entire weight of the electrode and means (not shown) are provided for relaxing the grip of one or more of the clamps which may be done manually or by remote control means (see for example U.S. Patent No. 2,673,227). Ordinarily it is not necessary to relax the grip of the holder when the electrode is moved through the holder in accordance with the teaching of the present invention.

The auxiliary clamp which grips the electrode to force it to slide through the holder is indicated at 18. This clamp is also of conventional construction and any suitable known means such as rubber bags or sheets operated by pneumatic or hydraulic pressure may be employed for increasing or relaxing the grip of the auxiliary clamp on the electrode. The grip of the auxiliary clamp may be controlled manually or automatically by remote control apparatus as illustrated for example in U.S. Patent No. 2,778,865. Preferably the auxiliary clamp is designed to carry the entire weight of the electrode without help from the electrode holder.

In accordance with the present invention a closed system is provided for generating the force required to move the electrode through the holder. The closed system includes a first chamber 20 which is connected by a passageway or conduit 22 to a second chamber 24 which is of greater cross sectional area than chamber 20.

As shown in the drawings the closed system may be most conveniently positioned on the electrode suspension frame 16. A member such as piston 26 is slidably mounted in chamber 20 to form a fluid seal (liquid or gas) with the walls of the chamber. Piston 26 is connected by rod 28 to a rigid beam or frame member 30 which is in turn connected to the auxiliary clamp 18 so that as the piston moves up and down in chamber 20 the auxiliary clamp will move along with the piston.

As indicated in the drawings, a liquid such as oil 32 is supplied to chambers 20 and 24. Preferably the volume of oil is such that when piston 26 is in position at the top of chamber 20, the oil fills the space in chamber 20 below the piston and chamber 24 is only partially filled with oil.

When the electrode is to be lowered through the holder a fluid (either liquid or gas) such as air is supplied under pressure to the top of piston 26 by opening the control valve 34 in pipe 36. Pressure on top of piston 26 causes the piston to move down in chamber 20 to displace the oil which flows through conduit 22 by way of by-pass 38 into chamber 24 where the oil compresses the air mass in the space above the level of the oil. The valve 40 in pipe 42 of chamber 24 is of course closed at this time. A one way valve such as ball valve 44 in conduit 22 forces the oil to flow through by-pass 38 and a valve such as a needle valve 46 regulates the rate of flow of the oil through by-pass 38.

As the piston moves down in chamber 20 it carries auxiliary clamp 18 downwardly and the auxiliary clamp which has a tight frictional grip on the electrode causes the electrode to move down through the holder. The needle valve 46 in by-pass 38 is so adjusted that the oil provides back pressure against piston 26 to oppose the downward movement of the piston. In this way the oil acts as a cushion against any sudden abrupt movement, and the electrode moves slowly and evenly down through the holder without shock which might otherwise damage the suspension mechanism or electrode.

When piston 26 reaches the bottom of chamber 20 valve 34 is closed and the grip of the auxiliary clamp on the electrode is released. Thereafter valve 34 is opened to the atmosphere whereupon the compressed air mass in chamber 24 expands to force oil to flow through conduit 22 into chamber 20 where the oil forces piston 26 to return to its starting position. Auxiliary clamp 18 slides upwardly on the electrode along with piston 26 and when the piston has reached its starting position the grip of the auxiliary clamp on the electrode is tightened and made ready for another cycle.

The system of the present invention may also be used for raising the electrode relative to the holder. In such case the grip of the auxiliary clamp on the electrode is relaxed and then valve 40 in pipe 42 is opened to the atmosphere. As a result the weight of the auxiliary clamp causes the oil to flow through valve 46 into chamber 24 and the clamp slides down the electrode casing until piston 16 is at the bottom of chamber 20. The auxiliary clamp is made to tightly grip the electrode and compressed air is supplied to chamber 24 through pipe 42 to force the oil back into chamber 20 and return piston 16 to its starting position as shown in the drawings. This procedure may be repeated until the electrode is raised the desired distance up through the holder.

In the form of structure illustrated in the drawings two pistons controlled in accordance with the teaching of the present invention, are utilized for lowering the electrode down through the holder but it will be obvious to those skilled in the art that only one or any desired number of pistons may be employed.

If desired a single chamber 24 may be connected to a plurality of piston chambers by means of an annular conduit arranged to surround the electrode. Any convenient valve arrangement may be employed to control the flow of oil in the closed system of the present invention.

Fully automatic controls may be employed for operating the system of the present invention. Such automatic controls are schematically illustrated in FIG. 3. As there shown a conventional solenoid valve 48 is employed to control the flow of fluid under pressure to the top of piston 26 in chamber 20 and a conventional solenoid valve 50 is employed to control the flow of fluid to the auxiliary clamp 18 for relaxing or increasing the grip of the auxiliary clamp on the electrode. Solenoid valves 48 and 50 are conventional two way type valves adapted to connect chamber 20 and the pressure chamber (not shown) of auxiliary clamp 18 to the atmosphere or to a supply of fluid under pressure. The pipes for supplying fluid through the control valves 48 and 50 to chamber 20 and auxiliary clamp 18 are not shown as these would only clutter the drawing.

As illustrated in the drawing the electrode is in starting position ready to be lowered through the holder. At this time solenoid valve 50 is set to supply fluid under pressure to auxiliary clamp 18 which is tightly gripping the electrode. Solenoid valve 48 is connected by conventional electric wiring to a push button 52 in a control panel 54. When the electrode is to be lowered through the holder the switch of push button 52 is closed by pressing the button whereupon solenoid valve 48 is actuated to supply fluid under pressure to the top of piston 26 to move it down to the bottom of chamber 20 and slide the electrode down through its holder. As previously described when the piston moves down oil flows into chamber 24 to compress the air in that chamber.

When piston 26 reaches the bottom of chamber 20 the contact arm 56 carried by auxiliary clamp 18 closes the contact switch 58. Contact switch 58 is connected by conventional electric wiring to both of the solenoid valves 48 and 50 and when contact switch 58 is closed both solenoid valves 48 and 50 are actuated to vent the auxiliary clamp and chamber 20 to the atmosphere which releases the fluid pressure supplied to these members. Thereupon the expansion of compressed air in chamber 24 forces oil to flow into chamber 20 and return the piston and auxiliary clamp to their starting position. When the auxiliary clamp reaches its starting position contact arm 56 closes the switch 60. Switch 60 is connected to solenoid valve 50 by conventional electric wiring and when the switch is actuated the solenoid valve supplies fluid under pressure to auxiliary clamp 18.

As previously described the electrode is consumed in the furnace during operation and the suspension frame must be gradually lowered to compensate for electrode consumption. When the suspension frame reaches its lower limit a contact arm 62 carried by the frame will close a switch 64. Switch 64 is wired in conventional manner through the control panel to solenoid valve 48 so that the closing of switch 64 will actuate solenoid valve 48 to supply fluid under pressure to the top of piston 26 whereupon the electrode is lowered down through the holder. As the electrode is lowered through the holder into the furnace, conventional control apparatus (not shown) automatically actuates the electrode hoist (not shown) to raise the suspension frame 16 and open switch 64 which will occur before piston 26 reaches the bottom of chamber 20.

A timer 66 on control panel 54 is also connected by conventional wiring to solenoid valve 48. The timer may be set to give electrical impulses at regular intervals to actuate solenoid valve 48 and start an electrode slipping cycle.

Except for solenoid valve 48 the closed system for control of electrode slippage through the holder illustrated in FIG. 3 is identical with the system shown in FIGS. 1 and 2.

It will be understood that it is intended to cover all changes and modifications of the preferred embodiment

I claim:

1. In an electric smelting furnace of the type in which there is an electrode holder which frictionally grips and supports the electrode in the furnace and an auxiliary electrode clamp connected to a member which when moved is capable of applying force to the auxiliary clamp to move the clamp relative to the electrode when the grip of the clamp is relaxed and to move the clamp and slide the electrode through the holder when the grip of the auxiliary clamp is tightened on the electrode, the improvement which comprises a first chamber in which said member is slidably mounted, a second chamber, a liquid in said two chambers which is in physical contact with one side of said member and which liquid only partially fills said second chamber to leave a space therein, a conduit for conducting a flow of said liquid from one chamber into the other, means for supplying a fluid under pressure to the second side of said member to generate a force of sufficient magnitude to move the member and said auxiliary clamp and to cause liquid to flow from the first chamber into the second chamber the air in the space of said second chamber being confined so as to become compressed by said flow of liquid, whereby the liquid in contact with said member provides a cushion against a sudden abrupt movement of said member and auxiliary clamp.

2. A structure as specified in claim 1 which includes means for releasing the fluid pressure in said first chamber to allow the compressed air in said second chamber to expand and cause liquid to flow into said first chamber to exert a force on the said one side of said member to move said member back towards its starting position.

3. A structure as specified in claim 1 which includes means for supplying air under pressure into the space in said second chamber.

4. A structure as specified in claim 1 in which means including at least one valve member is provided for controlling the rate of flow of liquid between the two chambers.

5. A structure as specified in claim 1 in which said conduit includes a one way valve member set to permit liquid to flow from said second chamber into said first chamber and in which a second conduit is provided for by-passing the flow of liquid from said first chamber around said one way valve member and into said second chamber said by-pass conduit having a valve member therein for controlling the rate of flow of liquid.

6. A structure as specified in claim 2 in which the cross sectional area of said second chamber is greater than the cross sectional area of said first chamber.

7. A structure as specified in claim 2 in which the means for supplying fluid under pressure to said first chamber and for releasing said fluid pressure includes an electrically actuated valve member and switch members electrically connected to said valve member and in which means are provided for closing said switch members to actuate said valve member to control the supply and release of fluid pressure in said first chamber automatically when the electrode reaches certain predetermined positions in the furnace.

8. In the operation of an electric smelting furnace of the type in which there is an electrode holder which frictionally grips and supports the electrode in the furnace and an auxiliary electrode clamp connected to a member slidably mounted in a closed system which when moved is capable of applying force to the auxiliary clamp to move the clamp relative to the electrode when the grip of the clamp is relaxed and to move the clamp and slide the electrode through the holder when the grip of the auxiliary clamp is tightened on the electrode, the method of controlling the movement of said member within the closed system which comprises the steps of supplying fluid under pressure to one side of said member to generate a force thereon which tends to move the member in one direction, opposing said movement of the member by supplying a liquid to the second side of said member to partially fill the closed space on the second side of said member and leave an air space, and then gradually causing the liquid to flow into such air space whereby a yielding hydraulic cushion is provided against sudden abrupt movement of said member and auxiliary clamp.

9. In the operation of an electric smelting furnace of the type in which there is an electrode holder which frictionally grips and supports the electrode in the furnace and an auxiliary electrode clamp connected to a member which when moved is capable of applying force to the auxiliary clamp to move the clamp relative to the electrode when the grip of the clamp is relaxed and to move the clamp and slide the electrode through the holder when the grip of the auxiliary clamp is tightened on the electrode, the method of controlling the movement of the said member within a hydraulic pneumatic system which includes a first chamber having the member slidably mounted therein and a second chamber connected by a conduit to said first chamber, said method comprising the steps of supplying liquid to said first and second chambers to establish physical contact between said liquid and one side of said member and to partially fill said second chamber to provide a space therein, supplying fluid under pressure to the second side of said member to generate a force of sufficient magnitude to move said member and cause liquid to flow into the second chamber and compress air in said space, controlling the rate of flow of said liquid to establish a back pressure against the member to provide a cushion against a sudden abrupt movement of said member.

10. The method specified in claim 9 which includes the step of tightening the grip of the auxiliary clamp on the electrode to slide the electrode through the holder when the said member is caused to move.

11. The method specified in claim 9 which includes the steps of relaxing the grip of the auxiliary clamp on the electrode, releasing the fluid pressure on the second side of said member to allow the compressed air to expand and force the liquid to flow into said first chamber to generate a force on the said one side of said member of sufficient magnitude to move said member back toward its starting position.

References Cited by the Examiner
UNITED STATES PATENTS

| Re. 2,461 | 1/67 | James. | |
|---|---|---|---|
| 2,099,368 | 11/37 | Levy | 92—134 X |
| 2,192,909 | 3/40 | Hoffar | 92—12 X |
| 2,778,865 | 1/57 | Kongsgaarden | 13—16 |

RICHARD WOOD, *Primary Examiner.*

JOSEPH V. TRUHE, *Examiner.*